(12) United States Patent
Wighton

(10) Patent No.: US 9,987,800 B2
(45) Date of Patent: Jun. 5, 2018

(54) SYSTEMS AND METHODS OF SIMULATING INTERMEDIATE FORMS FOR ADDITIVE FABRICATION

(71) Applicant: Formlabs, Inc., Somerville, MA (US)

(72) Inventor: Shane Wighton, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 565 days.

(21) Appl. No.: 14/543,138

(22) Filed: Nov. 17, 2014

(65) Prior Publication Data

US 2016/0136896 A1    May 19, 2016

(51) Int. Cl.
| | |
|---|---|
| *B29C 67/00* | (2017.01) |
| *G05B 19/18* | (2006.01) |
| *B33Y 50/00* | (2015.01) |
| *B29C 64/386* | (2017.01) |

(52) U.S. Cl.
CPC ........ *B29C 67/0088* (2013.01); *B29C 64/386* (2017.08); *B33Y 50/00* (2014.12); *G05B 2219/49007* (2013.01)

(58) Field of Classification Search
CPC ... B29C 64/386; B29C 67/0088; B33Y 50/00; G05B 2219/49007
See application file for complete search history.

(56) References Cited

U.S. PATENT DOCUMENTS

| | | |
|---|---|---|
| 8,565,909 B2 | 10/2013 | Bickel et al. |
| 2012/0185218 A1 | 7/2012 | Bickel et al. |
| 2013/0060535 A1 | 3/2013 | Fruth |
| 2014/0163717 A1 | 6/2014 | Das et al. |
| 2014/0303942 A1 | 10/2014 | Wighton et al. |
| 2015/0066178 A1 | 3/2015 | Stava |

FOREIGN PATENT DOCUMENTS

| | | |
|---|---|---|
| WO | WO 2014/066538 A1 | 5/2014 |
| WO | WO 2014/210374 A1 | 12/2014 |

OTHER PUBLICATIONS

International Search Report and Written Opinion for PCT/US2015/060992 dated Jan. 28, 2016.

*Primary Examiner* — Abdelmoniem Elamin
(74) *Attorney, Agent, or Firm* — Wolf, Greenfield & Sacks, P.C.

(57) ABSTRACT

According to some embodiments, a method of optimizing an additive fabrication process for an object is provided, the method comprising obtaining a representation of an intermediate form of the object, the intermediate form being an expected shape of the object when partially fabricated by the additive fabrication process, simulating one or more forces expected to be applied to the intermediate form of the object during the additive fabrication process, evaluating one or more results of the simulating step against one or more criteria, and adapting the additive fabrication process based at least in part on a result of the evaluating.

20 Claims, 11 Drawing Sheets

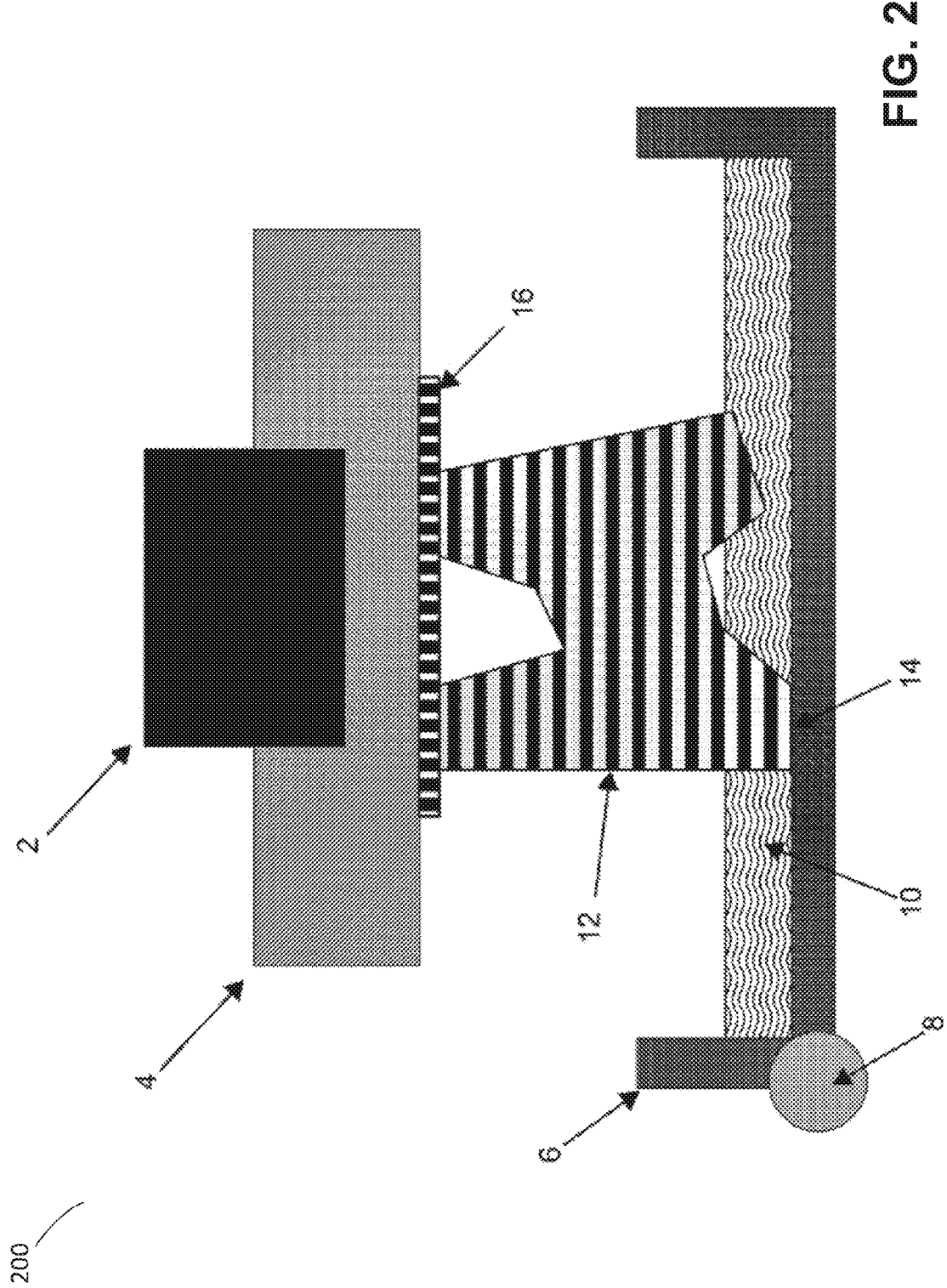

SYSTEMS AND METHODS OF SIMULATING INTERMEDIATE FORMS FOR ADDITIVE FABRICATION

FIELD OF INVENTION

The present invention relates generally to systems and methods for additive fabrication (e.g., 3-dimensional printing) that simulate the behavior of one or more intermediate forms of an object.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden and adhere to previously cured layers or the bottom surface of the build platform.

SUMMARY

Systems and methods for additive fabrication that simulate the behavior of one or more intermediate forms of an object are provided.

According to some aspects, a method of optimizing an additive fabrication process for an object is provided, the method comprising obtaining a representation of an intermediate form of the object, the intermediate form being an expected shape of the object when partially fabricated by the additive fabrication process, simulating one or more forces expected to be applied to the intermediate form of the object during the additive fabrication process, evaluating one or more results of the simulating step against one or more criteria, and adapting the additive fabrication process based at least in part on a result of the evaluating.

According to some aspects, at least one non-transitory computer readable medium comprising an executable program that, when executed, causes a computer to perform a method of optimizing an additive fabrication process for an object, the method comprising obtaining a representation of an intermediate form of the object, the intermediate form being an expected shape of the object when partially fabricated by the additive fabrication process, simulating one or more forces expected to be applied to the intermediate form of the object during the additive fabrication process, evaluating one or more results of the simulating step against one or more criteria, and adapting the additive fabrication process based at least in part on a result of the evaluating.

The foregoing summary is provided by way of illustration and is not intended to be limiting.

BRIEF DESCRIPTION OF DRAWINGS

The accompanying drawings are not intended to be drawn to scale. For purposes of clarity, not every component may be labeled in every drawing. In the drawings:

FIG. 2 depicts an illustrative additive fabrication process, according to some embodiments;

DETAILED DESCRIPTION

Figure 1:
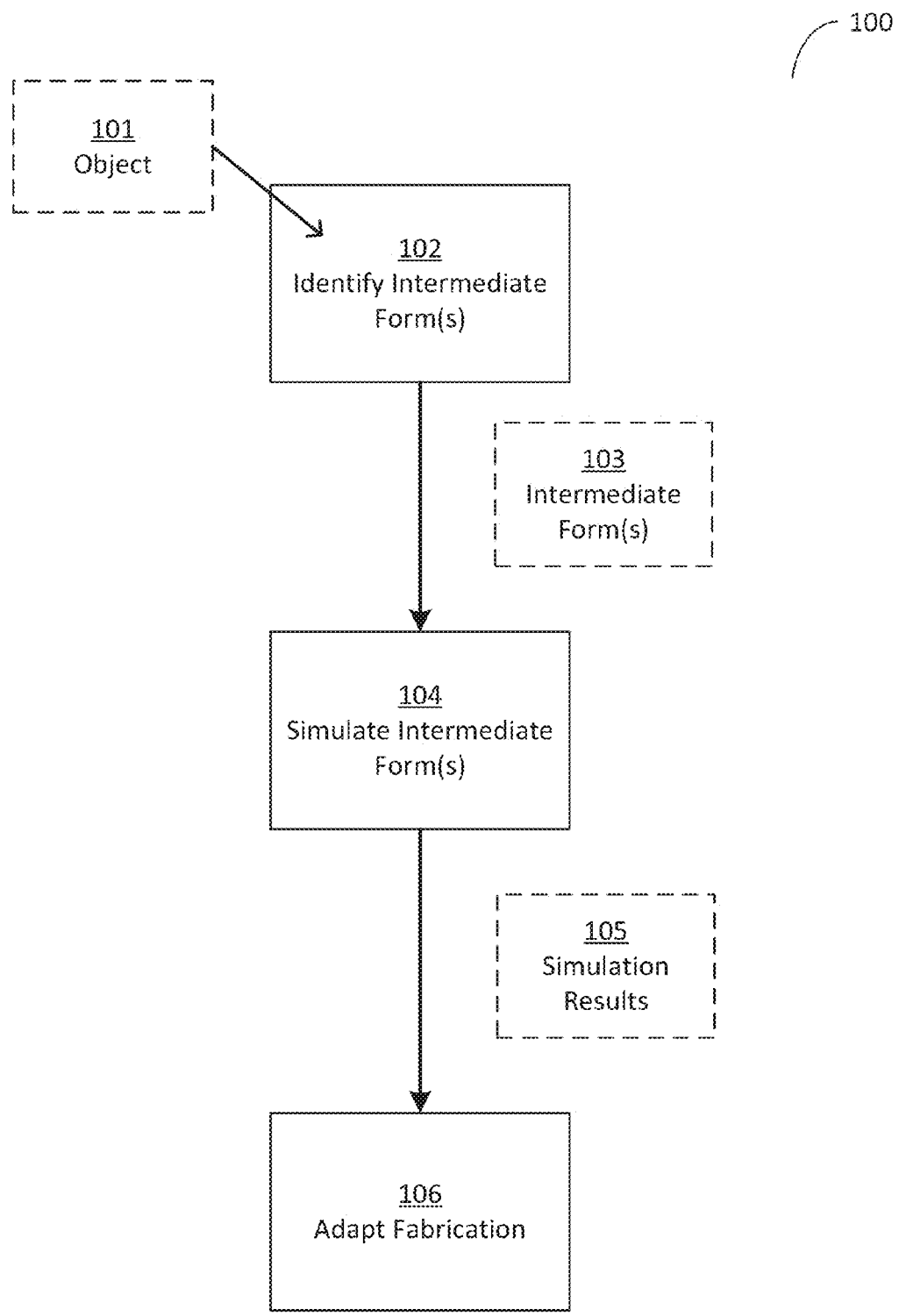
FIG. 1 depicts a method of simulating intermediate forms of an object and adapting an additive fabrication process based on results of the simulation, according to some embodiments.

Systems and methods for additive fabrication (e.g., 3d printing) that simulate the behavior of one or more intermediate forms of an object are provided. Objects formed using additive fabrication generally transition through a number of intermediate forms during the fabrication process before the final form of the object is produced. Since additive fabrication inherently produces an object by incrementally supplying material, the shape of the object being formed changes a number of times during the fabrication process. The shapes produced between the beginning of fabrication, where typically no material is present, and the end of fabrication, at which the object is formed, are referred to herein as "intermediate forms." For example, where an object is fabricated from a number of layers, an intermediate form that comprises some, but not all, of the layers of the object may be produced during the fabrication process.

Intermediate forms of an object may be subject to a variety of influences during the fabrication process, which may include influences produced by the fabrication device and/or by the environment in which the device is located. These influences may, for example, include gravitational forces, environmental conditions (e.g., ambient temperatures, humidity, heat from components of the additive fabrication device), and/or mechanical forces. In some cases, one or more of these influences may have deleterious effects on the intermediate forms of the object, which may in turn result in negative effects upon the final form of the fabricated object. The final form of objects may have different physical properties than one or more intermediate forms of the part.

A partial solution to some problems caused by mechanical or gravitational influences may be to fabricate support structures along with the desired object, such that each intermediate form of the object has sufficient, or at least improved, stability. Following the completion of the additive fabrication process, the support structure may then be removed from the object through one or more post-processing steps. In some cases, however, support structures can lead to surface deformations or other flaws in the object being fabricated, such as flaws caused by the attachment to the object and/or by the removal of the support structures from the object. The removal process in particular can damage the object in numerous ways, including by leaving part of the support structure behind, removing part of the object with the support structure, damaging the object, or otherwise marring the surface finish of the object. These flaws can be particularly apparent when support structures are fabricated using the same material as the desired object.

The inventors have recognized and appreciated that negative effects on a fabricated object may be mitigated, and thereby the quality of objects improved, by simulating the behavior of one or more intermediate forms of an object and adapting an additive fabrication process for forming the object based on results of the simulation. Simulation of an intermediate form of an object may identify ways in which the intermediate form may be negatively impacted during fabrication, which may not be apparent from a simulation or inspection of the fabricated object. Aspects of the fabrication process may be adapted as a result of the simulation, which may reduce or remove the effects of influences to the fabrication process, thereby improving the quality of the final form of the object.

According to some embodiments, an expected intermediate form of an object to be fabricated may be determined or otherwise identified. The intermediate form may be simulated based on the expected fabrication process, which may include the effects of mechanical, environmental and/or gravitational forces expected to be applied to the intermediate form during fabrication. To the extent that a simulation predicts undesirable effects to an intermediate form, corrective measures may be taken to adapt the fabrication process to reduce or eliminate these effects. Any number of intermediate forms may be determined and analyzed in this manner, both before and/or during fabrication of an associated object.

According to some embodiments, a simplified representation of an intermediate form may be produced or otherwise obtained. A simulation of a simplified representation of an intermediate form may simulate the application of forces to the intermediate form during the additive fabrication process with reduced computational complexity, albeit with a possibility of reduced accuracy, compared with a complete simulation of the intermediate form. In some cases, the intermediate form may be represented by a connected group of geometrically simple structures (e.g., cubes, rods, spheres, etc.), which may require less computational power to simulate than the intermediate form itself.

According to some embodiments, a simplified representation of an intermediate form may be represented, at least in part, by a number of nodes, at least some of which may be connected to one another. A node may be an abstract point at a location having one or more associated attributes such that the node is in some way characteristic of the structure of an intermediate form at that location. A simplified representation of an intermediate form may thereby be formed from a number of connected nodes. Such as representation has a simple mechanical structure yet may be simulated in place of the full intermediate structure to produce comparable results to a simulation of the intermediate structure.

Irrespective of how the intermediate form is provided to the simulation (i.e., either in a full representation or a simplified representation), the intermediate form may be simulated based on any number of influences expected to be applied to the intermediate form at the time of its fabrication. Simulated influences may include any number of "passive" factors, such as gravitational forces, forces caused by material shrinkage or expansion, and/or may include any number of "active" factors, such as forces exerted against the intermediate form as part of the fabrication process, including fluid dynamic forces or separational forces. Other relevant forces may result from dynamic behaviors of the intermediate form of the part, such as resonance or reactions from prior stages of fabrication continuing into the stage at which the intermediate form is produced.

Once a simulation of an intermediate form has been performed, some measure of forces expected to be applied to the intermediate form at the time of its production may be determined. According to some embodiments, determined forces, and/or displacements resulting from said forces, may be compared with previously determined tolerances. Where the forces and/or displacements exceed a tolerance, some aspect of the fabrication process may be adapted as a result.

According to some embodiments, a support structure may be generated, or an existing support structure adapted, for an object based on a result of a simulation of an intermediate form of the object. As discussed above, one or more aspects of the fabrication process of an object may be adapted based on simulation(s) of one or more intermediate forms of the object. In some embodiments, a result of such simulation(s) is used, at least in part, to produce a support structure for the object that is expected to provide suitable mechanical support to the object during fabrication. According to some embodiments, a support structure previously determined may be modified based on a result of simulation(s) of one or more intermediate forms of an object.

According to some embodiments, one or more process parameters may be adjusted based on a result of a simulation of an intermediate form of an object. Process parameters may relate to mechanical movements of aspects of the additive fabrication device being used, temperature settings of the device, etc. The simulation may indicate forces applied to an object during fabrication that exceed a desired amount, and adjustment of one or more process parameters may accordingly reduce said forces below the desired amount (or at least bring the forces closer to the desired amount). According to some embodiments, one or more process parameters are adjusted based on an amount by which a force determined by simulation of an intermediate form exceeds a tolerance amount.

Following below are more detailed descriptions of various concepts related to, and embodiments of, systems and methods for additive fabrication that simulate the behavior of one or more intermediate forms of an object. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Although particular systems and methods for additive fabrication that simulate the behavior of one or more intermediate forms of an object have been described and shown herein, it is envisioned that the functionality of the various methods, systems, apparatus, objects, and computer readable media disclosed herein may be applied to any now known or hereafter devised additive fabrication technique wherein it is desirable to simulate the behavior of one or more intermediate forms of an object.

As discussed above, the inventors have recognized and appreciated that negative effects on a fabricated object may be mitigated, and thereby the quality of objects improved, by simulating the behavior of one or more intermediate forms of an object and adapting an additive fabrication process for forming the object based on results of the simulation. FIG. 1 depicts a method of simulating intermediate forms of an object and adapting an additive fabrication process based on results of the simulation, according to some embodiments. Method 100 performs one or more simulations based on object 101, which is an object to be fabricated via additive fabrication. Object 101 may be described by one or more computer readable files that describes the shape of the object, or via any other suitable technique.

In act 102, one or more intermediate forms of object 101 are identified, which may include analyzing object 101 and determining the intermediate forms based on said analysis. According to some embodiments, a granularity, or resolution, at which to determine intermediate forms of object 101 may be established. The granularity may be based directly or indirectly on user input, and/or on other factors such as one or more properties of the object to be fabricated and/or the particular additive fabrication technique to be used. In some cases, a resolution may be expressed in terms of process stages, such as the number of layers formed, or in other expressions such as in units of time. For example, some embodiments of the invention may use a resolution sufficient to simulate every stage of the fabrication process, or may choose to simulate the fabrication process at periodic intervals, such as upon every formation of N layers or prior to the formation of loop-closing structures, such as the keystone in an arch. Points during fabrication at which an intermediate form is identified are referred to herein as "steps." In some embodiments, a step size (e.g., measured in time, height, number of layers, etc.) may be increased or decreased based on user input and/or based on acceptable error tolerances. In some embodiments, a user may manually select one or more stages of fabrication for which intermediate stages are determined.

As discussed above, in some embodiments a simplified representation of an intermediate form may be determined. Any number of the intermediate forms identified in act 102 may be simplified in this way, including all or none. As discussed above, in some embodiments a simplified representation may be formed from a number of nodes, which may have associated attributes.

In act 104, the intermediate form(s) 103 that were identified in act 102 are simulated. A simulation of a particular intermediate form may evaluate any number of forces expected to be applied to the intermediate form during a period of fabrication. The specified period may be a time period (e.g., the minute after the intermediate form is produced, a five minute period centered around the production of the intermediate form, etc.) or may be a process period (e.g., during production of the ten layers subsequent to production of the intermediate form, from production of the intermediate form to production of another identified intermediate form, etc.). Each simulation may use the same or different periods for evaluating forces for a respective intermediate form as other simulations that are performed in act 104.

According to some embodiments, a simulation of an intermediate form may be conducted using a dynamical simulation, a discrete simulation, an agent-based simulation, or using any other suitable technique. In some embodiments, a finite element analysis of the intermediate form may be performed in order to simulate the results of the application of forces to the intermediate form. Outputs from such a simulation may include resulting forces and deformations within the intermediate form, as well as other effects. Other types of simulations may further account for effects external from the intermediate form of the part, such as the flow, distribution, or other behaviors of unprocessed or partially processed fabrication material. Parameters of the apparatus used to additively form an object may further be modeled and simulated, including thermal changes, optical characteristics, tool accelerations or velocities, mechanical response times, or other characteristics. In some embodiments, a simulation includes simulation of one or more components of the additive fabrication device to be used to fabricate the object.

In act 106, the results of the simulation(s) performed in act 104 are evaluated to determine whether the behavior of the simulated intermediate form falls within acceptable ranges for the particular fabrication process, materials, and desired result. Various types of evaluation may be performed. In some cases, maximum acceptable forces to be applied to any region of the object produced from a given material may be specified. Maximum acceptable displacement or deformation of a given region may additionally, or alternatively, be specified. For some types of simulations, various dynamic properties may also be evaluated, such as the introduction of resonance within a given intermediate form. Should the simulated behavior of any given region of the object fall outside of acceptable parameters, that region may be noted for further potential action, along with potential information regarding the degree and kind of tolerance exceeded in the simulation. Those having skill in the art will appreciate that any such acceptable ranges may be determined in any one of a number of ways, depending on the type of fabrication process and material properties of the fabricated material.

According to some embodiments, one or more regions of an intermediate form may be evaluated based at least in part on their position within the object being analyzed. Particular regions of an object may have higher (or lower) importance to a user than other regions, and consequently an evaluation of the forces applied to such a region might utilize narrower (or wider) tolerances. For example, a region at the interface of the object and a build platform may have structural importance (e.g., so the object successfully adheres to the build platform during fabrication) and one or more specific thresholds may be set for such regions, so as to, for example, ensure the strength of the bond between the object and the build platform. Additionally, or alternatively, regions on the surface of an object, or of visual or dimensional significance, may be designated or identified such that more conservative thresholds may be set to ensure that any negative effects caused to such regions are reduced below a specified level.

According to some embodiments, one or more thresholds for a given region of an intermediate form may depend, at least in part, on a time variable relating to the formation of material associated with the given region. The inventors have noted that certain objects formed using certain additive manufacturing techniques may have material properties that vary over time periods short enough to impact the fabrication process. Accordingly, when evaluating a region within a first intermediate form, the material properties of the material in that region may in practice differ from material in the same region within a second intermediate form. In the case of photopolymer-based fabrication, for example, chemical reactions forming a rigid polymer material may continue for a significant period of time subsequent to application of actinic radiation, which may alter material properties such as stiffness and maximum acceptable stress over time. Accordingly, it may be beneficial to apply a different evaluation for a region containing newly-formed solid material in one intermediate form than with the same region at a later stage in fabrication when the material in that region is no longer newly-formed (e.g., because the material has cooled and now has different material properties). In the case of fabrication techniques utilizing thermoplastic extrusion (e.g., fused deposition modeling), the temperature of extruded material decreases over time once extruded, which alters a number of its material properties. As such, materials may decrease or increase in strength, durability, or other metrics such that the relevant acceptable range of forces or displacement may also be advantageously decreased or increased for newly formed material. Such changes may, in some cases, be reflected by modifying thresholds associated with a region as a function of time or process stage.

According to some embodiments, a maximum allowable displacement may be defined for one or more points of the object, and an expected displacement of those points based on simulation of one or more intermediate forms may be compared with these displacements. If a displacement produced by simulation is greater than the maximum allowable displacement for a corresponding point on the object, the location may be flagged as needing corrective action. As discussed above, in some embodiments an intermediate form may be simulated based on a simplified representation of the intermediate form. In such embodiments, a maximum allowable displacement may be set for a node within the simplified representation. In some embodiments, the maximum allowable displacement is between 1.0 and 2.0 mm.

To the extent that any behavior of a simulated intermediate form falls outside of an acceptable range, one or more corrective measures may be taken in order to try to bring the behavior within an acceptable range. These corrective measures may be taken prior to, and/or during, fabrication of the object for which intermediate forms were simulated. For example, a number of simulations may be performed, and a future additive fabrication process adapted, based on an object to be fabricated. Alternatively, an object may be partially fabricated when a simulation of an intermediate form of the object is performed, and subsequent steps in the additive fabrication process may be adapted based on the simulation. In some use cases, a modification of a fabrication process of a subsequent step or steps may be made in order to alter forces expected to be applied to an intermediate form.

For example, an inverted stereolithography process typically applies a variety of forces to intermediate forms of an object during fabrication. The magnitude of many of these forces, however, may be at least partially controlled through process parameters. Peak forces during a separation step (e.g., separation of a layer of material from a container) may, for example, be reduced by decreasing the speed at which the separation occurs. Such modifications may be particularly advantageous for the formation of parts with significant flexibility or elasticity. Additionally, or alternatively, modifications to the geometry of an object to be formed may be made in order to alter the behavior of the intermediate when subjected to the expected forces. For instance, additional temporary or permanent support structures may be added to the geometry of the object to be formed, thus increasing the extent to which the object may resist applied forces. Such structures may be added directly to nodes that have been flagged for corrective action, or may be added in other locations. As those having skill in the art will appreciate, many other potential corrections may also be used, such as reorientation of the part, subdivision of the part into multiple separately printable components, or use of an alternate fabrication material or technique.

In some embodiments, the type or extent of corrective measure taken may be based on the degree to which or ways in which the simulated behavior of the intermediate form departs from an acceptable range. For example, a region of an intermediate form for which a tolerance is exceeded by a small amount may be adapted to be supported by a comparatively thin or minimal support structure capable of adding a smaller amount of structural stability, such as thin rods or "pillars" extending from the build platform. In contrast, a regions for which a tolerance is exceeded by a more substantial amount may be supported by a comparatively thick or compound support structure capable of adding more substantial amounts of structure stability, such as thicker support pillars, trussed support structures, or other geometries such as supporting walls.

FIG. 2 depicts an illustrative additive fabrication process, according to some embodiments. Exemplary stereolithographic printer 200 forms an object in a downward facing direction on build platform 4, wherein partially fabricated object 12 is shown in the figure. The partially fabricated object 12 represents an example of an intermediate form of the object being fabricated. In the example of FIG. 2, build platform 4 opposes the floor of container 6, which is filled with a photopolymer resin 10. An object may be formed layerwise, with an initial layer attached to the build platform 4.

The floor of container 6 may be transparent to actinic radiation, which may be targeted at portions of a thin layer of liquid photocurable resin resting on the floor of the container. Exposure to actinic radiation cures a thin layer of the liquid resin, which causes it to harden to form layer 14. The layer 14 is at least partially in contact with both a previously formed layer and the surface of the container 6 when it is formed. The top side of a cured resin layer typically bonds to either the bottom surface of the build platform 4 or, in the case of layer 14, with the previously cured resin layer in addition to the transparent floor of the container.

In the illustrative inverted stereolithography system 200, various forces may be applied against the object during its fabrication process. At the beginning of a layer fabrication cycle, for example, an intermediate form of the object may be pushed against the bottom of the container 6 when a new layer of solid material is formed, which may introduce various compressive forces across the layer being formed. These compressive forces may be compounded by interactions with fluid dynamics caused by liquid resin that must be displaced by the intermediate part.

At the end of a layer fabrication cycle, an intermediate form of the object may be partially attached to the lower surface of the container 6 and may require mechanical separation, such as described in U.S. patent application Ser.

No. 14/333,885, incorporated herein in its entirety. Depending on the mechanism used to provide such mechanical separation, various forces may be applied across the layer being formed. Using a direct pulls along the build axis, for example, may subject the object to tensile forces along the same axis. Using a peel operation may subject the object to both tensile forces in the build axis and sliding forces along the bottom of the build platform. Use of a sliding system may subject the object to sliding forces along the direction of the sliding axis. Systems using a combination of motions may subject an object to a combination of forces. During the fabrication cycle generally, the intermediate object may further experience forces due to the contraction or expansion of the material used to form the object. Such contraction or expansion forces may be caused in various ways, such as thermal or chemical configuration changes.

Any of the above-described forces which may be applied to intermediate forms of an object being fabricated via illustrative device 200, in addition to any other forces, may be simulated and analyzed using the techniques described herein. As discussed above, these techniques may generally be used with any type of additive fabrication technology, and illustrative device 200 is provided merely as one example.

To illustrate some of the techniques described herein, the following figures depict an illustrative Y-shaped object for which intermediate forms are identified and analyzed. With the exception of FIG. 3B, these figures depict the illustrative object as a two-dimensional cross-section through the object. However, as will be appreciated, the below descriptions relating to the two-dimensional cross-section may be generalized to the three-dimensional case.

Figure 3B:
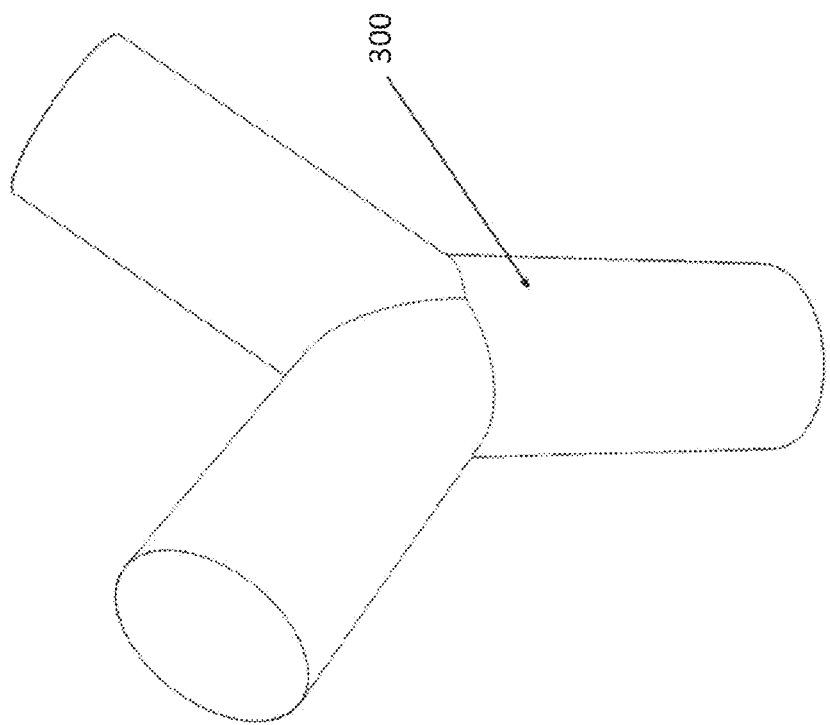
FIGS. 3A-B depict front-view and isometric representations, respectively, of an illustrative object to be analyzed, according to some embodiments.
Figure 3A:
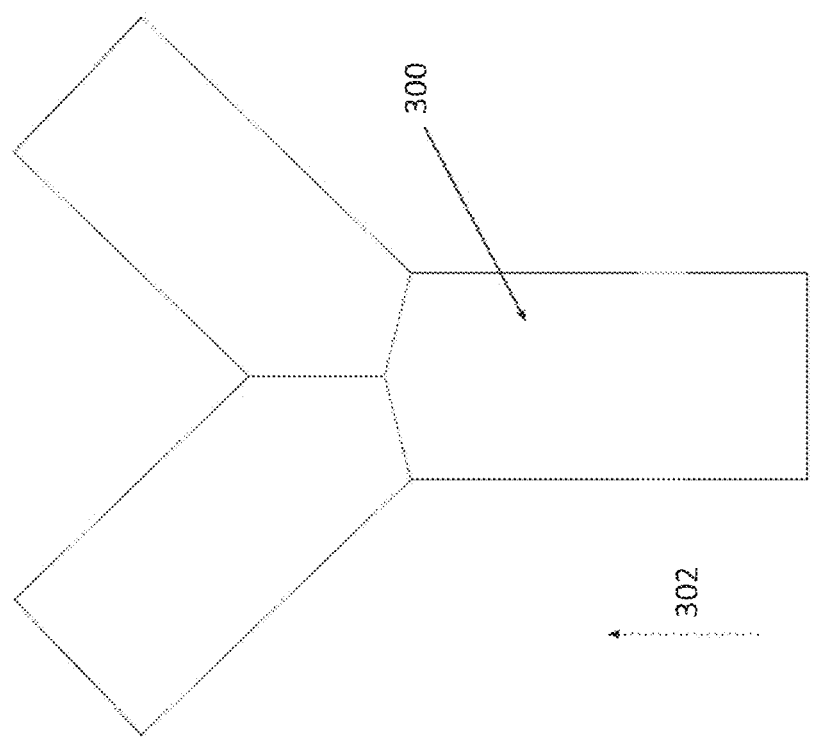

FIGS. 3A-B depict front-view and isometric representations, respectively, of an illustrative object 300, according to some embodiments. FIGS. 4A-D, 5A-B, 6A-B and 7A-C illustrate various techniques using an object having the same shape as object 300 as an illustrative example. In particular, FIGS. 4A-D illustrate identification of intermediate forms of the shape in addition to generation of a simplified representation of these intermediate forms.

Figure 4B:
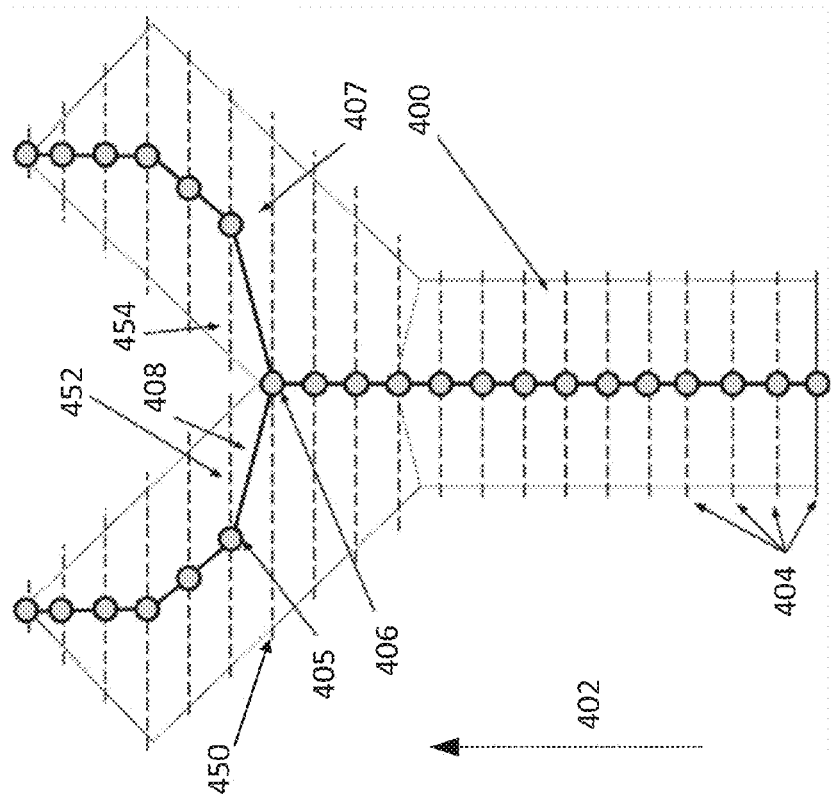
FIG. 4B depicts a characteristic node structure for the illustrative object illustrated in FIG. 4A, according to some embodiments.
Figure 4A:
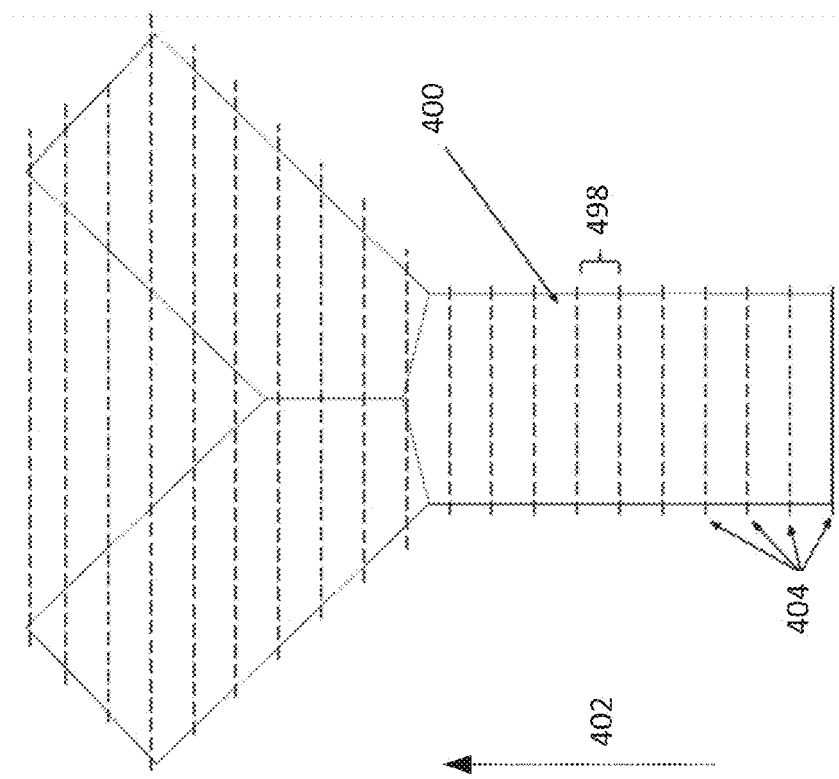
FIG. 4A depicts the illustrative object depicted in FIGS. 3A-B, divided into cross sections, according to some embodiments.
Figure 4C:
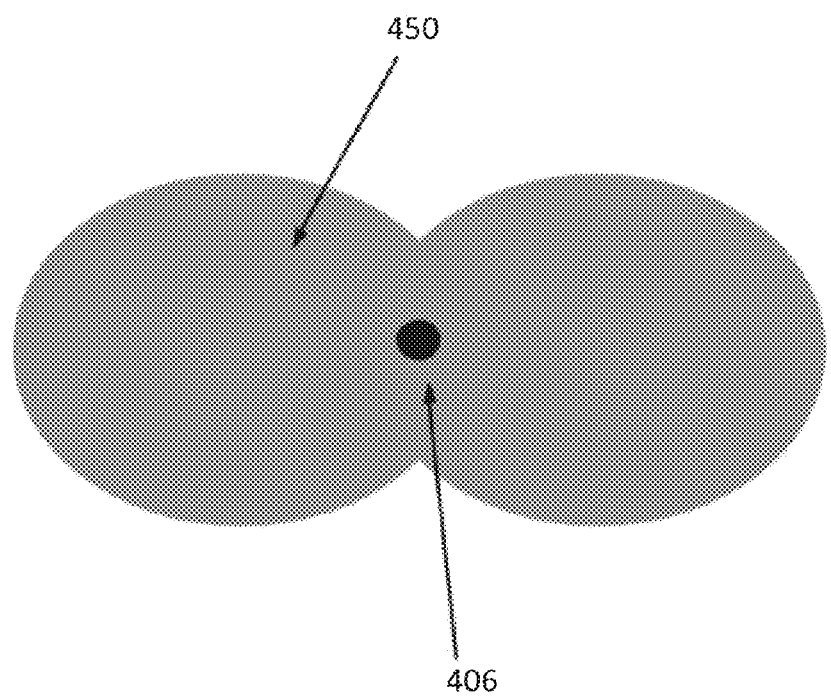
FIG. 4C-D depict cross sections at characteristic nodes of the structure shown in FIG. 4B, according to some embodiments.
Figure 4D:
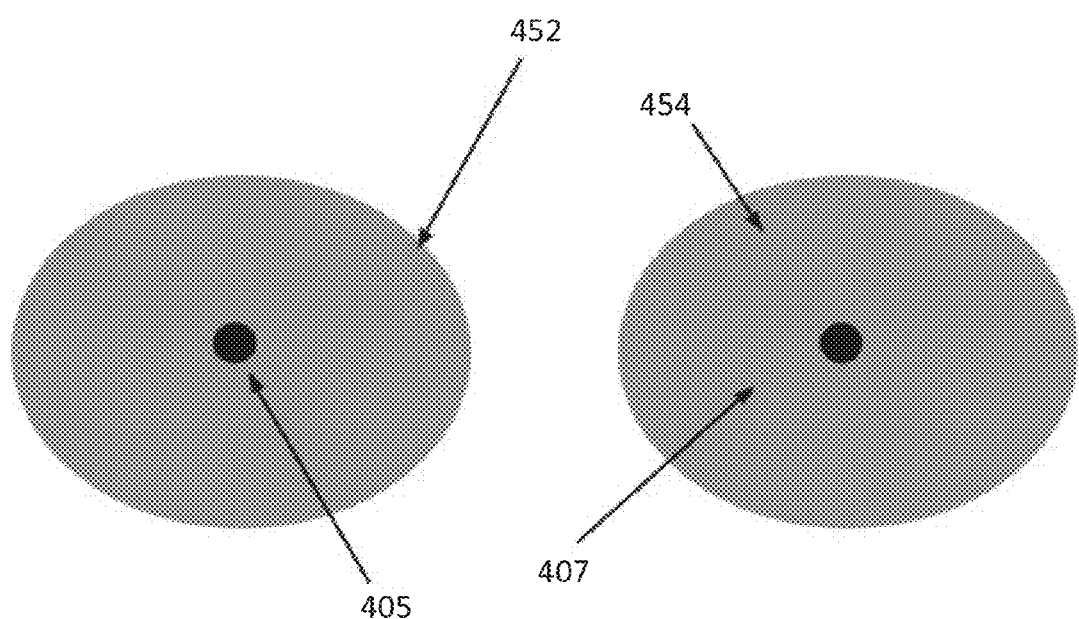

In FIG. 4A, object 400, having the same shape as object 300, is shown in cross-section with an identified set of fabrication stages shown by dashed lines, which include illustrative stages 404. The size along z-axis 402 of each stage may be, as discussed above, determined based on user input and/or other analysis. In the example of FIG. 4A, the object 400 is formed beginning at the lowest height in the z-axis.

An intermediate form may be identified at each stage, which in the example of FIG. 4A, means that an intermediate form is determined at each of the stages shown by dashed lines in the x-y plane. For example, if the stages are separated by ten layers of formed material, and each stage is evenly spaced in layers as in the example of FIG. 4A, the first intermediate form represents the first ten layers, the second intermediate form represents the first twenty layers, etc.

As discussed above, while the intermediate forms depicted by FIG. 4A may be simulated and analyzed as shown, a simplified representation of the intermediate forms may also be generated to reduce computational complexity of such simulations. According to some embodiments, a simplified representation of an intermediate form comprises a plurality of characteristic nodes, each located in an identified stage, each of which may be connected to zero or more nodes in an adjacent stage. Whether or not a node is connected to another node may be used to represent whether the nodes are physically connected in the model such that forces applied to one node would tend to transfer to the second node by compression, tension, or other direct or indirect means. Determinations of connectedness may be made based on the degree of such transfer. In some embodiments, connectedness may be determined based on whether a line segment between node n and node m is entirely contained within the boundaries of the part. Alternatively, connectedness may be determined based on whether the cross section of the object containing node n overlaps an amount above a threshold with the cross section of the object containing node m (e.g., when viewed in a direction perpendicular to the cross-sectional planes).

As shown in FIG. 4B, characteristic nodes (shown as circles in each stage) may be generated for each of the identified stages. In the illustrated embodiment, the centroid of a cross section region in each stage is chosen as the location of a characteristic node. For example, node 406 is the centroid of the cross section 450, also shown in FIG. 4C. In the case of regions 452 and 454, characteristic nodes 405 and 407 are generated in the centroids of regions 452 and 454, respectively. Connections 408 are formed between characteristic nodes 405 and 406, and between characteristic nodes 406 and 407. Characteristic nodes, and connections between them, may be determined for the remaining stages of object 400. According, a simplified representation of the plurality of intermediate forms of object 400 may be formed from the identified nodes and connection (shown in the figure using a connected graph of nodes).

According to some embodiments, a connection between a pair of nodes may have one or more attributes associated with it, which may represent various characteristics regarding the portion of the object located between said pair of nodes. Such characteristics may include the cross-sectional area, area moment of inertia, or other physical properties. In some embodiments, the cross-sectional area associated with a given connection may be determined based on an average of the areas of the cross sections of stages containing the start and end characteristic nodes of the connection. In some embodiments, other techniques may be used such as taking the average, maximum, or minimum of the cross-sectional areas of all stages located along the path formed by the connection. Other values, such as those within an area moment of inertia tensor, may also be calculated in various ways.

In some embodiments, a connection between nodes may be treated as a cylinder having a length of the connection and a diameter equal to the cross sectional area previously determined. In some cases, the moment of inertia for such an object may be calculated based on the formula $\int_A (x-c) \otimes (x-c) dA$. In other embodiments, other numerical techniques, such as integration over the mass of the material located between characteristic nodes, may be utilized.

Figure 5B:
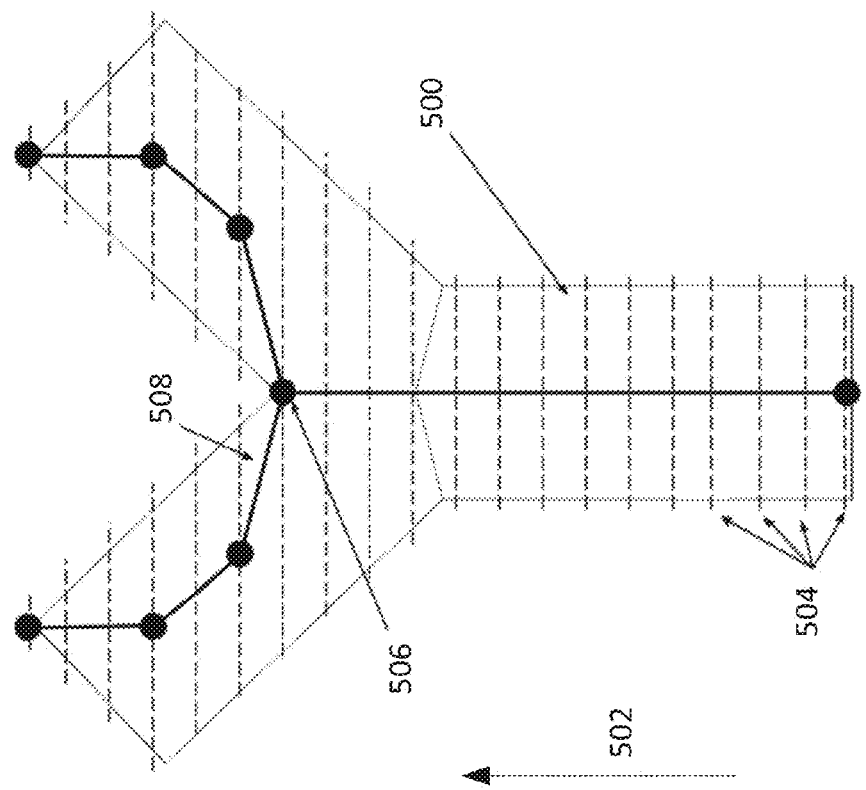
FIGS. 5A-B depict an illustrative simplification procedure applied to the characteristic node structure depicted in FIG. 4B, according to some embodiments.
Figure 5A:
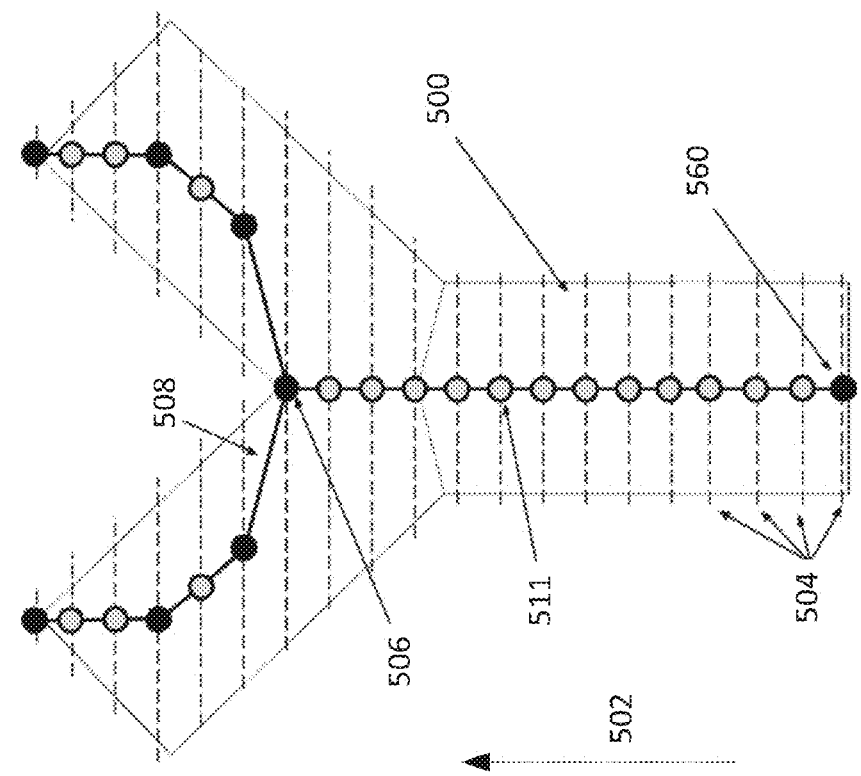

FIGS. 5A-B depict an illustrative simplification procedure applied to the characteristic node structure depicted in FIG. 4B, according to some embodiments. In some cases, it may be beneficial to further simplify a simplified representation of an intermediate form, such as the one produced in the example of FIGS. 4A-D. The amount of further simplification may, for example, be determined based on a threshold, which may be preset by a user or another process, or may be dynamically determined based on fabrication process parameters.

In the example of FIGS. 5A-B, particular characteristic nodes of the structure shown in FIG. 4B are identified for removal from the node structure. The nodes that are not removed are shown in FIGS. 5A-B as filled circles, whereas the nodes identified for removal are shown in FIG. 5A as unfilled circles. FIG. 5B accordingly represents the tree structure shown in FIG. 5A with the identified nodes removed. Nodes that remain in FIG. 5B are connected to one another; note that the connections in FIGS. 5A and 5B follow the same path. Accordingly, FIG. 5B is an example of a reduced graph where only nodes that have an effect on the connections between nodes are retained.

As in the example of FIG. 5B, some representations of an object's structure may not include a node at every stage for which an intermediate form is to be analyzed. Accordingly, a structure to simulate these intermediate forms in the absence of nodes throughout the form must be determined. For example, in FIG. 5B, three of the four stages labeled 504 do not include a node, therefore to simulate an intermediate form representing the third stage (say), a dummy node may be identified at the end point of the tree. These dummy nodes are referred to herein as "temporary" nodes.

Figure 6B:
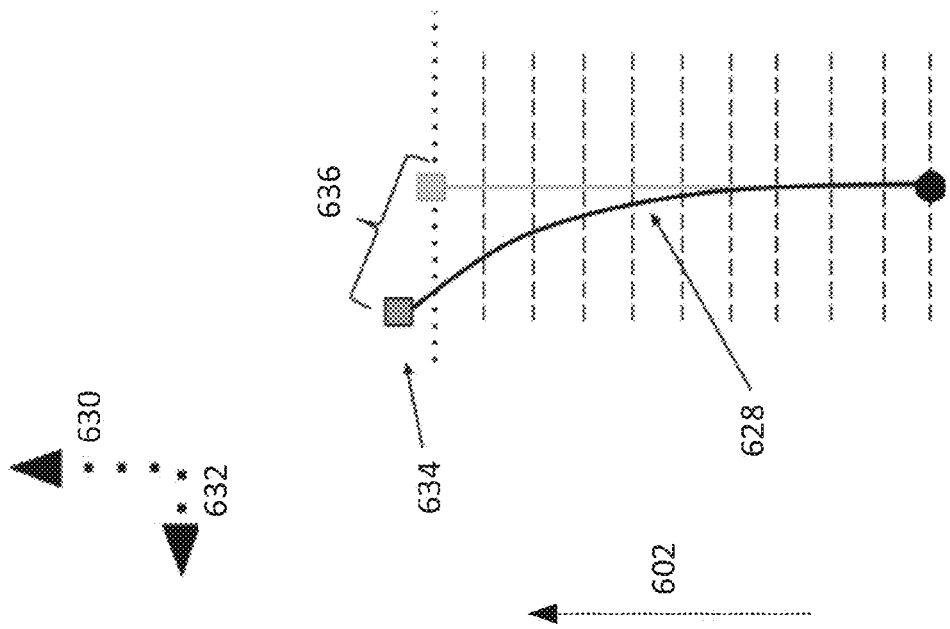
FIGS. 6A-B depict an illustrative temporary characteristic node structure representing an intermediate form of a part, according to some embodiments.
Figure 6A:
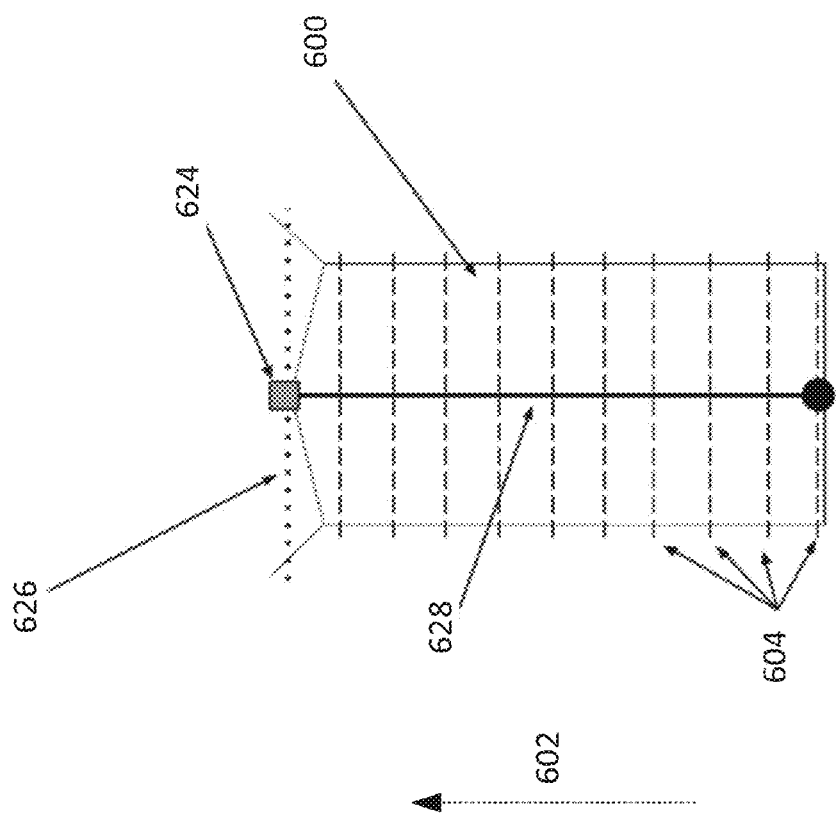

FIGS. 6A-B depict an illustrative temporary characteristic node structure representing an intermediate form of a part, according to some embodiments. As shown in FIG. 6A, a temporary characteristic node structure may be created for the fabrication at a given stage 626 where the temporary structure does not include a characteristic node located at stage 626. In the example of FIG. 6A, temporary node 624 may be constructed at the level of the given stage 626. The properties of the connection 628 may be determined in various ways, including by further analysis of the model or, in some embodiments, by a linear interpolation based on the distance of the temporary node 624 between the previously constructed nodes in the original connection (e.g., in the example of FIG. 5B, between the node at the bottom of the structure and node 506).

The temporary characteristic node structure 600 may be derived via the following process. First, the progress of the fabrication process along the z-axis (602) may be determined based on the step between stages and set as a threshold value along the z-axis (e.g., the height along the z-axis of step 626). An intermediate representation of the object may then be prepared by copying the characteristic nodes and associated connections for all characteristic nodes with z-axis coordinates less than the z threshold. To the extent that any connections exist between nodes with z-axis coordinates less than the z threshold and nodes with z-axis coordinates greater than the z threshold, a temporary node (such as node 624) may be added along the line of the connection at the plane of the z threshold. The attributes of such a temporary connection may be the same as the attributes of the original connection or may be constructed through interpolation or another approximation technique.

Once formed, a temporary characteristic node structure may be used to simulate the behavior of the intermediate form expected at the given stage 626. According to some embodiments, a connection 628 may be used to represent a physical structure approximating the intermediate form as a type of beam. Key characteristics of the beam formed by connection 628 may be described by properties associated with the connection regarding the actual part, such as the area of the cross sections along the connection, as well as general material properties such as Young's modulus. The behavior of such a beam may be simulated in any one of a number of approaches, such as finite element analysis.

In the example shown in FIG. 6B, a simulation determines a predicted deflection 636 of a temporary characteristic node 634 based on deformation of the beam 628 when subjected to a pulling force 630 and a sliding force 632 during fabrication. The amount of deflection 636 may, in some case, exceed a tolerance value and as a result may demand corrective action.

Figure 7A:
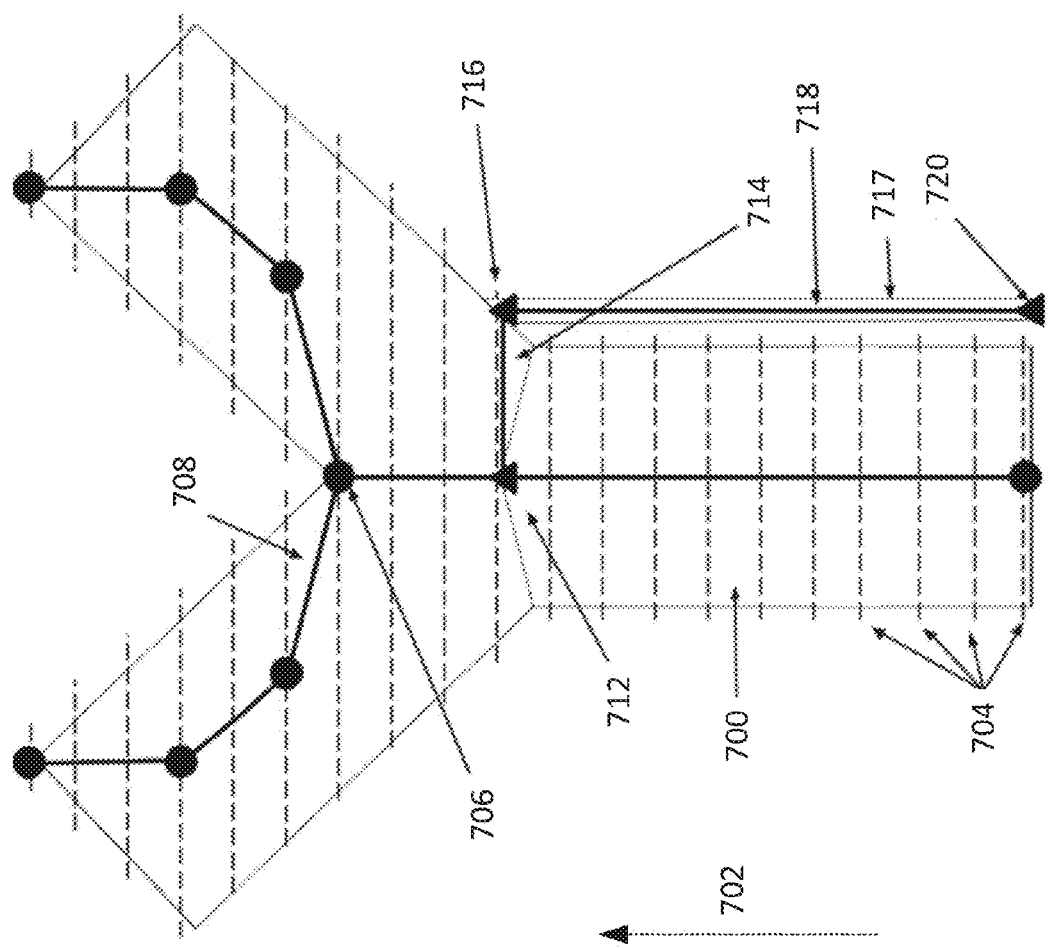
FIG. 7A depicts an illustrative object including a support structure with a characteristic node structure representing the support structure, according to some embodiments.

An example of such corrective action is provided in FIG. 7A. In particular, a support structure 717 in the form of a thin column or pillar is added to the model of the object 700. Along with the addition of the support structure, the characteristic node structure is modified to account for the addition of the support structure. In particular, a connection 718 representing the support pillar 717 may be added to the characteristic node structure. As shown, this connection begins at a characteristic node 720 on the build platform and ends at a characteristic node 716 located on the surface of the object 700 where the support pillar intersects the object. The original temporary characteristic node 724 may be converted into a support structure node 712. Support structure nodes 712 may, in some embodiments, represent portions of the model to be treated differently than portions of the model represented by temporary characteristic nodes. As one example, certain embodiments may use support structure node designations to replace support structure with alternate support structure, rather create additional support structure, should later simulations suggest inadequacy in support structure. In other respects, support structure nodes may be treated the same as temporary characteristic nodes. As shown in the example of FIG. 7A, support structure node 712 formed from the temporary characteristic node 724 lies within the object, away from the surface location where the support pillar 717 intersects the part. Accordingly, an additional connection 714 may be added to account for the force transfer between the support pillar and object that occurs in the actual intermediate form.

Figure 7C:
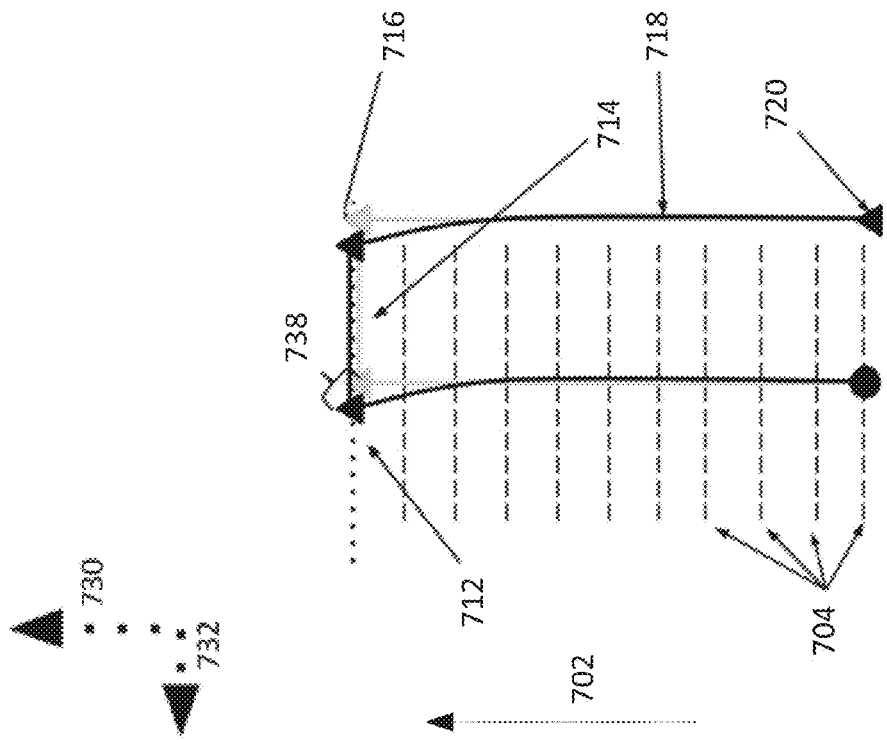
FIG. 7B-C depict a temporary characteristic node structure obtained from the characteristic node structured depicted in FIG. 7A, according to some embodiments.
Figure 7B:
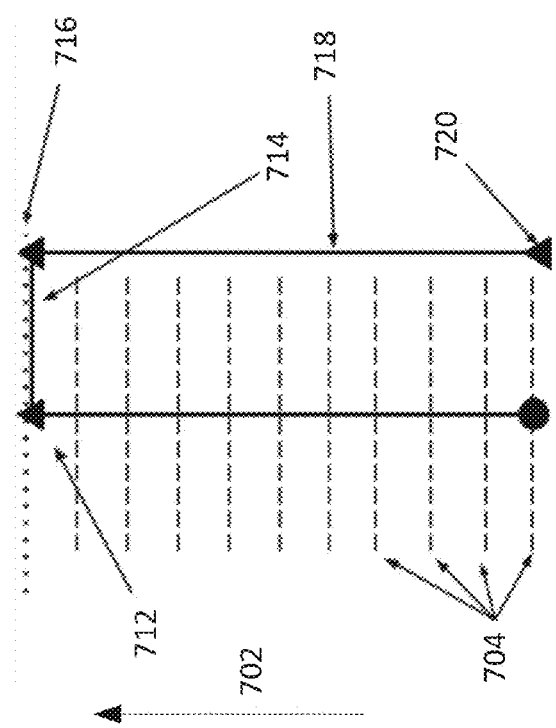

A simulation may now be performed on the object having the support structure 717. A characteristic node structure may be determined at the stage of interest, of which an example is shown in FIG. 7B. As nodes 712 and 716 are at the stage of interest (and are part of the intermediate form represented by that stage), they are not removed and no temporary nodes are required to complete the ends of any connection. As shown in FIG. 7C, a simulation produces a reduced predicted deflection 738 compared with a simulation of the same structure in FIG. 6B due to the addition of the support structure represented by the connection 718.

As can be seen by a comparison of the exemplary simulation results depicted in FIGS. 6B and 7C, the addition of the support structure in FIG. 7A in response to the simulation results depicted in FIG. 6B increases the predicted stability of the part during the additive fabrication process. Thus, support structure may be added to portions of an object that may benefit from support structure with both specificity and accuracy by targeting specific portions of the object predicted to have stability during fabrication below an acceptable level. It will be appreciated that a support structure may be modified to adjust a level of support it provides via much the same process described above. In addition, reevaluation of support structures by performing an additional simulation step on a modified intermediate form of the part provides numerous advantages, including allowing for more conservative initial support generation, more complex support structure geometries, and increased fabrication reliability.

Figure 8:
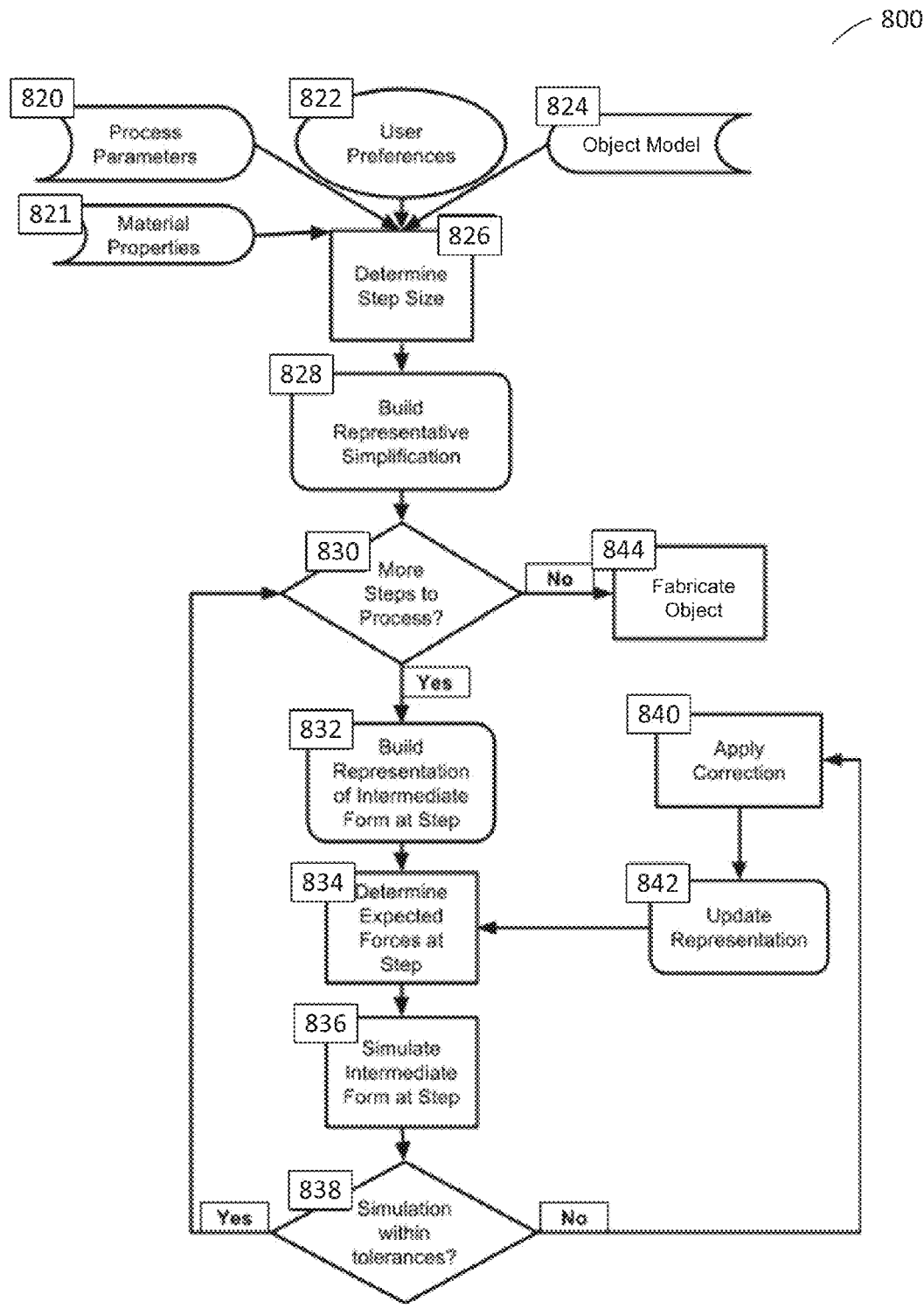
FIG. 8 depicts an illustrative method for simulating intermediate forms of an object and adapting an additive fabrication process based on results of the simulation, according to some embodiments.

FIG. 8 depicts an illustrative method for simulating intermediate forms of an object and adapting an additive fabrication process based on results of the simulation, according to some embodiments. Method 800 performs techniques described above for building a representation of an intermediate form, simulating the intermediate form, and adapting a fabrication based on a result of the simulation.

In acts 820, 821, 822 and 824, inputs to the process are provided, as described above. A step size, being a physical or temporal distance between intermediate forms identified in object model 824, is determined in act 826. Thus, an intermediate form is identified at each step based on the step size. In act 828, a simplified representation of each intermediate forms identified by the steps in act 826. A discussed above, the simplified representation may be a network of connected nodes, and may be further simplified such that there are fewer nodes than intermediate forms being analyzed.

In some embodiments, the following technique may be used in act 828 to simplify a graph of connected nodes. For each triplet of connected nodes, n1, n2, and n3, the distance between n2 and the midpoint between n1 and n3 is calculated. To the extent that such distance falls below a critical value, node n2 may be removed and the graph structure simplified. In order to maintain the connectedness of the graph, the connections between n1 and n2, and n2 and n3, are removed and a new connection is made between n1 and n3. In other embodiments, the angle formed at n2 from the intersection of lines extending from n1 to n2 and n3 to n2 may also be considered, such that node triplets with comparatively high angles may be preserved while node triplets with comparatively low angles may be simplified. Such simplification techniques may be iteratively repeated until no further simplification operations may be performed within the desired tolerances, at which point the simplification process is complete.

In some embodiments, the simplification of a triplet of connected nodes, n1, n2, and n3, into a new pair of nodes nA and nB may include a condensation of the attributes associated with the connection between n1 and n2 and the attributes associated with the connection between n2 and n3 into a single connection between nA and nB. Various approaches may be taken to combining such information based on the particular attribute at issue. For example, with regards to cross sectional area, various arithmetic approaches may be taken, such as determining the cross sectional area of the new connection by reference to minimum, maximum, or average values of the original cross sectional areas. Alternatively, any suitable calculation for originally determining the cross sectional area for each individual connection may be repeated based on the geometry of the object located along the new connection. Such an approach may be more appropriate for values such as moment of inertia which depend more critically on the length and geometry of the connection.

In act 832, a representation of an intermediate form is produced. For example, where the endpoints of the intermediate form do not include nodes in the simplified representation of the object, one or more temporary nodes may be determined for purposes of simulating the intermediate form, as described above.

In act 834, forces expected to be applied to the intermediate form are determined, and in act 836 the intermediate form is simulated using the determined forces to determine the effects, if any, of the expected forces on the intermediate form. According to some embodiments, forces applied against each node are calculated in act 834 on a per-node basis based on parameters associated with the node or connections to the node. In typical cases, all nodes in the system will be subjected to a force due to gravity that may be applied to each node. In some use cases, the force set per node may be set based on a mass characteristic associated with that node. Such a mass characteristic may be calculated or estimated in various ways, including estimation of volume in combination with known material density.

According to some embodiments, the following technique may be used in act 836 to simulate the application of forces to an intermediate form. Connections between characteristic nodes may be treated as if beams in a space frame structure, wherein the characteristic nodes represent fixed joints between beams. The structural characteristics of such a space frame may be partially characterized by various parameters relating to the materials and geometry of the beams. In such a way, a connection described in the characteristic node structure between nodes n1 and n2 may be converted into a beam having an axial stiffness of:

$$k = \frac{AE}{L}$$

and a torsional stiffness of $$k = \frac{nGJ}{L},$$

where A is the cross-sectional area, E is Young's modulus, L is the length of the beam, J is the second moment of area about the rotational axis, n is 4 for fixed ends, and G is the rigidity modulus of the beam. Values for E and G may be determined based on the properties of materials used during the additive fabrication process. Values such as L and J may be associated with a connection between nodes, as discussed above. Using these values, the forces applied to and deformation of nodes within such a space frame structure may be solved for any given application of forces, such as by using any suitable finite element approach.

Where the simulation is within desired tolerances, at act 838, any subsequent steps in the object are similarly analyzed by repeating acts 832, 834 and 836. Where the simulation is not within desired tolerances, a correction may be applied in act 840 and the representation of the object determined in act 828 updated in act 842.

For each step 830, embodiments of the present invention may prepare a representation of the intermediate form 832 expected to already have been fabricated at that step, including geometrical and structural characteristics of the expected intermediate form. In some use cases, such a representation may be a truncated form of the original object model with portions of the object yet to be formed in later stages removed from the model. In other instances, alternative representations may be prepared that allow for more advantageous simulation or later processing.

In some embodiments, the following techniques may be used to supply corrections to nodes in act 840 that were identified in act 838 as demanding correction. For each node identified in act 838, the position of the node is determined. Because, in some cases, an identified node may be within the interior of the object, a point on the surface of the object may be identified by choosing a point on the surface of the object nearest to the position of the identified node within the constraints of a given cross section. Using this surface point, a support structure may be generated and added to the object in order to provide support structure between the identified node and another portion of the object or build platform.

Support structures of various forms may be used, including support tip structures disclosed in U.S. patent application Ser. No. 14/275,459, incorporated here in its entirety. Following the generation of support structure, the characteristic node structure of the object may then be modified in the following way to account for the addition of the support structure. An initial node may be formed at the surface of the object where the support structure attaches. A connection between that node and the node originally identified for support is formed. The attributes of this connection may be determined using techniques discussed above to capture various material properties regarding the material between the two nodes. Additional nodes and connections are added attached to the surface node in order to represent the support structure added to the part. In the example of simple pillars extending up from the build platform to the surface point, for example, one additional node may be added at the build platform attachment point with one connection between the build platform node and the surface node. In more complicated examples, such as support structures involving both support pillars and support tips, multiple nodes and connections may be added.

In some embodiments, a new or updated representation of the expected intermediate form may be prepared in act 842 based on any modifications made during the preceding corrective operations. A new simulation may then be performed in act 836 which accounts for any modifications may to the parameters of the subsequent step or steps during the corrective operations. To the extent that the simulation shows behaviors falling further from the desired range, the proceeding corrective operations may be reversed and an alternate strategy selected. To the extent that the simulation shows behaviors improving, but still falling outside the desired range, additional corrective operations may be taken. In any event, an additional simulation may be run as described above with the altered set of corrective operations and the process repeated. Should repeated attempts at corrective operations fail, or require modifications outside of given ranges, the process may provide a user and/or an automated system with an indication of potential failures with the fabrication process. Alternatively, to the extent that the behavior of the simulated intermediate form falls within acceptable ranges, the process may move on to the next step (e.g., next intermediate form) in the fabrication process.

In certain embodiments utilizing the characteristic node structure described above, revaluation may be performed by a straightforward repetition of the proceeding steps based on an updated characteristic node structure incorporating the support structure added as a proposed correction. In some instances, such support structure may be insufficient. In such cases, additional support structures will tend to be added by the repetition of the proceeding steps. In some embodiments, this may advantageously result in support structures being added onto previously generated support structures. Such modifications minimize the amount of support structure added directly to the object while increasing the effective amount of support provided until the simulation suggest sufficient support is present. In some embodiments, the number of cycles spent performing such analysis may be limited, such that unwanted repetition and delay may be avoided. In some embodiments, exceeding a certain number of cycles, or tries, may cause an indication to be displayed to the user that an object may be unlikely to print successfully. In some further embodiments, such an indication may be accompanied or replaced by other automatic steps to attempt to resolve the potential problems with the part, such as altering the orientation of the object or the process parameters of the fabrication process.

In some embodiments, results from the simulation may also be communicated to the user in one or more ways. As one example, output from the simulation, including the degree to which the results of the simulation fall within specified tolerances, may be communicated to the user by the addition of color to the model, such as described in U.S. patent application Ser. No. 14/245,765, incorporated herein by reference. As another example, output from the simulation may be communicated to the user by graphically depicting simulation results, such as by animating a bending of the part.

Once all steps have been analyzed, an updated model of the object for fabrication, including with any modifications made during corrective operations, may be substituted for the original model and fabricated in act 844, including any fabrication process modifications made during the corrective operations. Alternatively, the fabrication process may be carried out in parallel with the acts described above.

Figure 9:
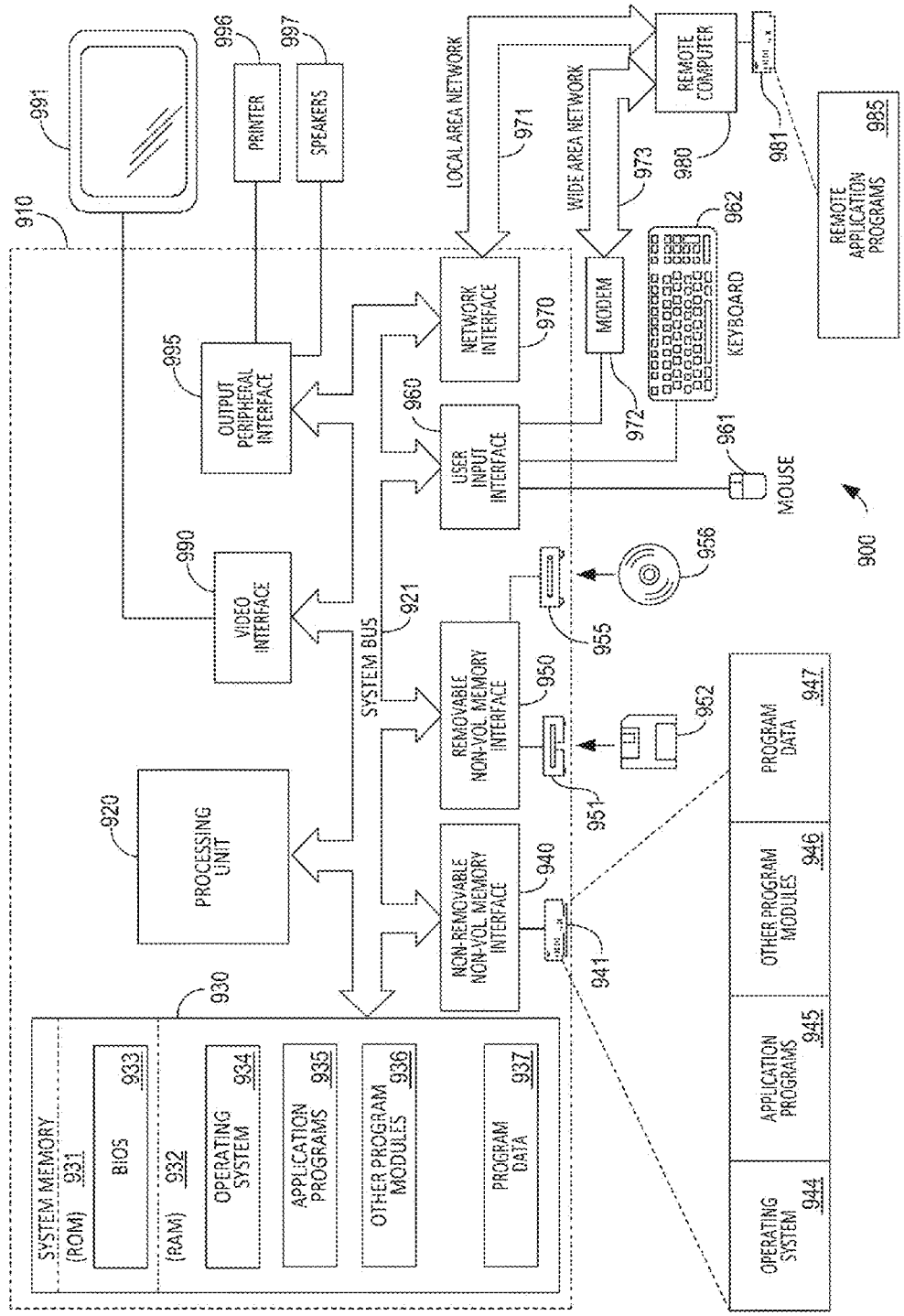
FIG. 9 illustrates an example of a suitable computing system environment on which aspects of the invention may be implemented.

FIG. 9 illustrates an example of a suitable computing system environment 900 on which aspects of the invention may be implemented. For example, the computing system environment 900 may be used to identify one or more intermediate forms of an object, to simulate one or more intermediate forms of an object, to instruct an additive fabrication device how to fabricate an object, to determine a simplified representation of an intermediate form, etc. Such a computing environment may represent a home computer, a tablet, a mobile device, a server and/or any another computing device.

The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing aspects of the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. For example, the various methods or processes may utilize software to instruct a processor to activate one or more actuators to perform motions such as those described herein, such as motion of one or more regions of a container and/or of a build platform. Examples of such approaches are described above. However, any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various inventive concepts may be embodied as one or more methods, of which examples have been provided. For example, systems and methods for simulating the behavior of one or more intermediate forms of an object have been provided herein. The acts performed as part of any method described herein may be ordered in any suitable way. Accordingly, embodiments may be constructed in which acts are performed in an order different than illustrated, which may include performing some acts simultaneously, even though these acts may have been shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. For example, techniques of simulating an intermediate form of an object for additive fabrication were described. These techniques may be applied in other contexts. As one example, various embodiments of the invention may be combined with other techniques for the creation of support structures, such as overhang or slope-based analysis, in order to determine the location of necessary supporting structures. As another example, various embodiments of the invention may be used to evaluate the printability of a given object without modification, including printing costs, post-processing costs, and a chance of failure. As yet another example, various embodiments of the invention may be used in a hybrid of additive and subtractive manufacturing techniques. Such modifications and improvements are intended to be within the spirit and scope of the invention. Accordingly, the foregoing description is by way of example only, and is not intended as limiting.

What is claimed is:

1. A method of optimizing an additive fabrication process for an object to be fabricated by an additive fabrication device, said optimization being based on a representation of an intermediate form of the object, the intermediate form being an expected shape of the object when partially fabricated by the additive fabrication device, the method comprising:

simulating, using at least one processor, one or more forces expected to be applied to the intermediate form of the object during fabrication by the additive fabrication device;

evaluating, using the at least one processor, one or more results of the simulating step against one or more criteria; and generating, using the at least one processor, instructions that, when executed by the additive fabrication device, cause the additive fabrication device to fabricate the part, said instructions being generated based at least in part on a result of the evaluating.

2. The method of claim 1, further comprising fabricating the object via the additive fabrication process according to the generated instructions.

3. The method of claim 1, wherein said instructions include a first plurality of instructions that, when executed by the additive fabrication device, cause the additive fabrication device to fabricate one or more support structures for the object, and wherein the first plurality of instructions are generated based at least in part on the result of the evaluating.

4. The method of claim 1, wherein said instructions are generated based on one or more parameters of the additive fabrication process determined based at least in part on the result of the evaluating.

5. The method of claim 1, wherein simulating the one or more forces expected to be applied to the intermediate form of the object during the additive fabrication process is based at least in part on a simplified representation of the intermediate form.

6. The method of claim 5, wherein the simplified representation includes a plurality of nodes and one or more connections between nodes.

7. The method of claim 6, wherein the one or more connections between nodes includes a first connection between a first node and a second node, and wherein the first connection is associated with one or more attributes representative of characteristics of a region of the object located between the first and second nodes.

8. The method of claim 1, wherein simulating the one or more forces expected to be applied to the intermediate form of the object includes finite element analysis.

9. The method of claim 2, wherein the additive fabrication process includes stereolithography.

10. The method of claim 1, further comprising:
obtaining a plurality of representations of intermediate forms of the object, each of the plurality of intermediate forms of the object being an expected shape of the object at a respective partially fabricated stage of the additive fabrication process; and
simulating one or more forces expected to be applied to each of the plurality of intermediate forms of the object during the additive fabrication process.

11. The method of claim 1, wherein the one or more results comprise at least one force predicted to be applied to a region of the object.

12. The method of claim 1, wherein:
evaluating the one or more results of the simulating step against one or more criteria comprises determining whether the one or more results are below one or more threshold values; and generating the instructions is based on which of the one or more results were determined to be below the one or more threshold values.

13. At least one non-transitory computer readable medium comprising an executable program that, when executed, causes a computer to perform a method of optimizing an additive fabrication process for an object to be fabricated by an additive fabrication device, said optimization being based on a representation of an intermediate form of the object, the intermediate form being an expected shape of the object when partially fabricated by the additive fabrication device, the method comprising:

simulating, using at least one processor, one or more forces expected to be applied to the intermediate form of the object during fabrication by the additive fabrication device;

evaluating, using the at least one processor, one or more results of the simulating step against one or more criteria; and generating, using the at least one processor, instructions that, when executed by the additive fabrication device, cause the additive fabrication device to fabricate the part, said instructions being generated based at least in part on a result of the evaluating.

14. The at least one non-transitory computer readable medium of claim 13, wherein said instructions include a first plurality of instructions that, when executed by the additive fabrication device, cause the additive fabrication device to fabricate one or more support structures for the object, and wherein the first plurality of instructions are generated based at least in part on the result of the evaluating.

15. The at least one non-transitory computer readable medium of claim 13, wherein said instructions are generated based on one or more parameters of the additive fabrication process determined based at least in part on the result of the evaluating.

16. The at least one non-transitory computer readable medium of claim 13, wherein simulating the one or more forces expected to be applied to the intermediate form of the object during an additive fabrication process is based at least in part on a simplified representation of the intermediate form.

17. The at least one non-transitory computer readable medium of claim 16, wherein the simplified representation includes a plurality of nodes and one or more connections between nodes.

18. The at least one non-transitory computer readable medium of claim 17, wherein the one or more connections between nodes includes a first connection between a first node and a second node, and wherein the first connection is associated with one or more attributes representative of characteristics of a region of the object located between the first and second nodes.

19. The at least one non-transitory computer readable medium of claim 13, wherein simulating the one or more forces expected to be applied to the intermediate form of the object includes finite element analysis.

20. The at least one non-transitory computer readable medium of claim 13, wherein the one or more results comprise at least one force predicted to be applied to a region of the object.

* * * * *

UNITED STATES PATENT AND TRADEMARK OFFICE
CERTIFICATE OF CORRECTION

PATENT NO. : 9,987,800 B2
APPLICATION NO. : 14/543138
DATED : June 5, 2018
INVENTOR(S) : Shane Wighton Page 1 of 1

It is certified that error appears in the above-identified patent and that said Letters Patent is hereby corrected as shown below:

In the Claims

At Column 21, Lines 10-11, Claim 7, delete "part" and replace it with --object--

At Column 22, Lines 22-23, Claim 13, delete "part" and replace it with --object--

Signed and Sealed this
Twentieth Day of November, 2018

Andrei Iancu
*Director of the United States Patent and Trademark Office*